United States Patent [19]
Allen

[11] 3,830,568
[45] Aug. 20, 1974

[54] MULTIPLE DETECTION VOLUME LASER DOPPLER VELOCIMETER

[75] Inventor: John B. Allen, Richardson, Tex.

[73] Assignee: Texas Instruments Incorporated, Dallas, Tex.

[22] Filed: May 25, 1973

[21] Appl. No.: 363,916

[52] U.S. Cl............... 356/28, 356/102, 350/162 R, 250/237 G
[51] Int. Cl. .......................................... G01p 3/36
[58] Field of Search.......... 356/28, 102; 350/162 R; 250/237 G

[56] References Cited
UNITED STATES PATENTS

| | | | |
|---|---|---|---|
| 3,649,125 | 3/1972 | Lehmann | 356/28 |
| 3,680,961 | 8/1972 | Rudd | 356/102 |
| 3,723,004 | 3/1973 | Brayton | 356/28 |
| 3,730,625 | 5/1973 | Brayton | 356/28 |

OTHER PUBLICATIONS

Orloff et al., "The Application of Laser Doppler Velocimetry to Trailing Vortex Definition & Alleviation", NASA, TMX-62243, Feb. 1973.
Farmer, Appl. Optics, Nov. 1972, pp. 2603-2612.

*Primary Examiner*—T. H. Tubbesing
*Assistant Examiner*—S. C. Buczinski
*Attorney, Agent, or Firm*—Harold Levine; Rene E. Grossman; Alva H. Bandy

[57] ABSTRACT

A multiple detection volume laser doppler velocimeter for continuously monitoring an aerosol for particle velocities and sizes is disclosed. A source of coherent light producing light beams at selected wavelengths is directed through: a beam separator separating the beams into a plurality of beams at selected wavelengths, beam splitters orienting and dividing at least two of the plurality of beams into two beams each at the selected wavelengths; and phase gratings for producing multiple beams of each beam received. The multiple beams are then converged to form at their intersections a plurality of detection volumes. Aerosols pass through the detection volumes and scatter light of the selected wavelengths. The scattered light is detected by transducers to produce electrical signals which are processed to produce signals representative of the horizontal and vertical components of particle velocity and size, and of the time it takes the particle to pass through the detection volume (duration signal). The duration signal is combined with a particle velocity signal to produce a signal indicative of particle size.

22 Claims, 22 Drawing Figures

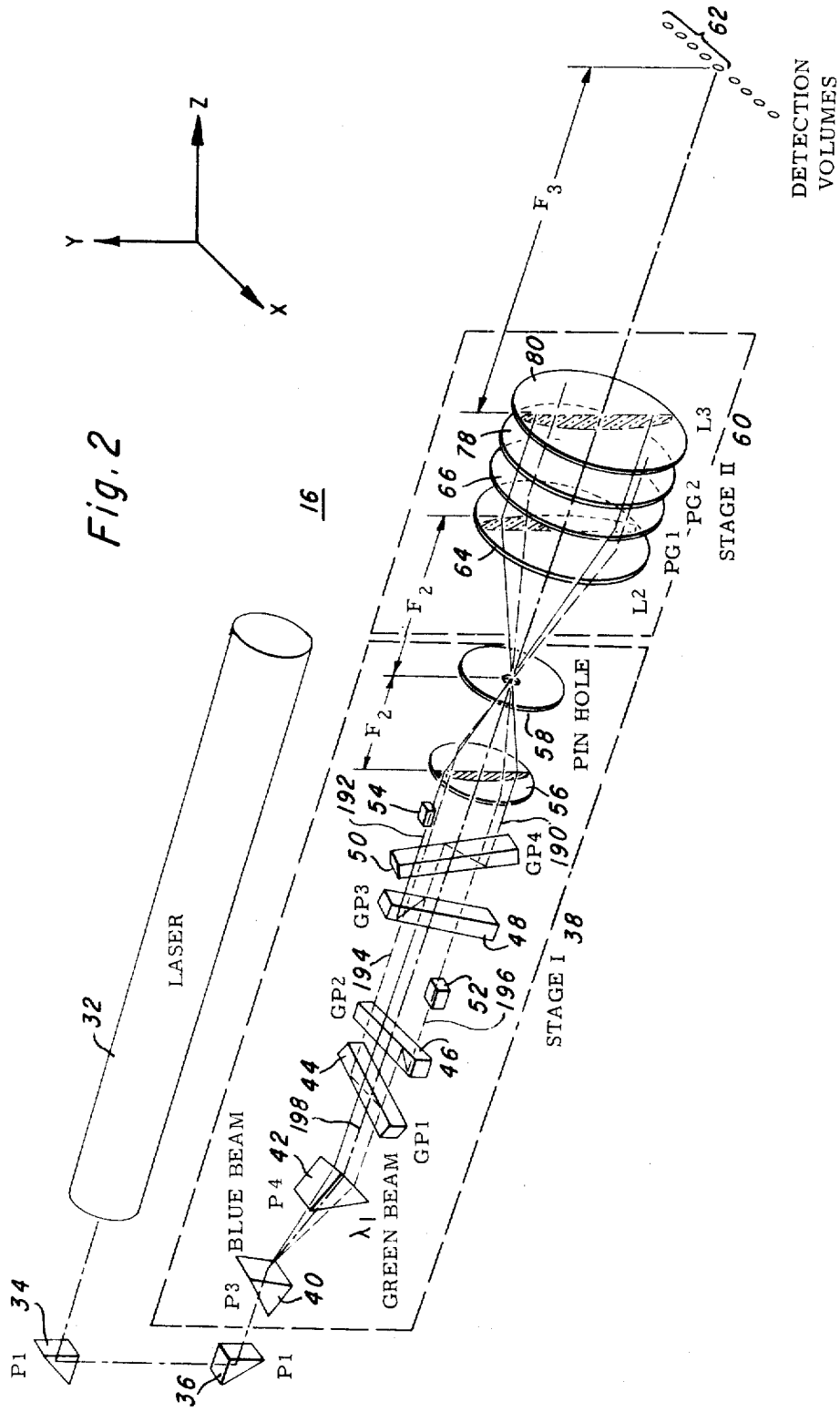

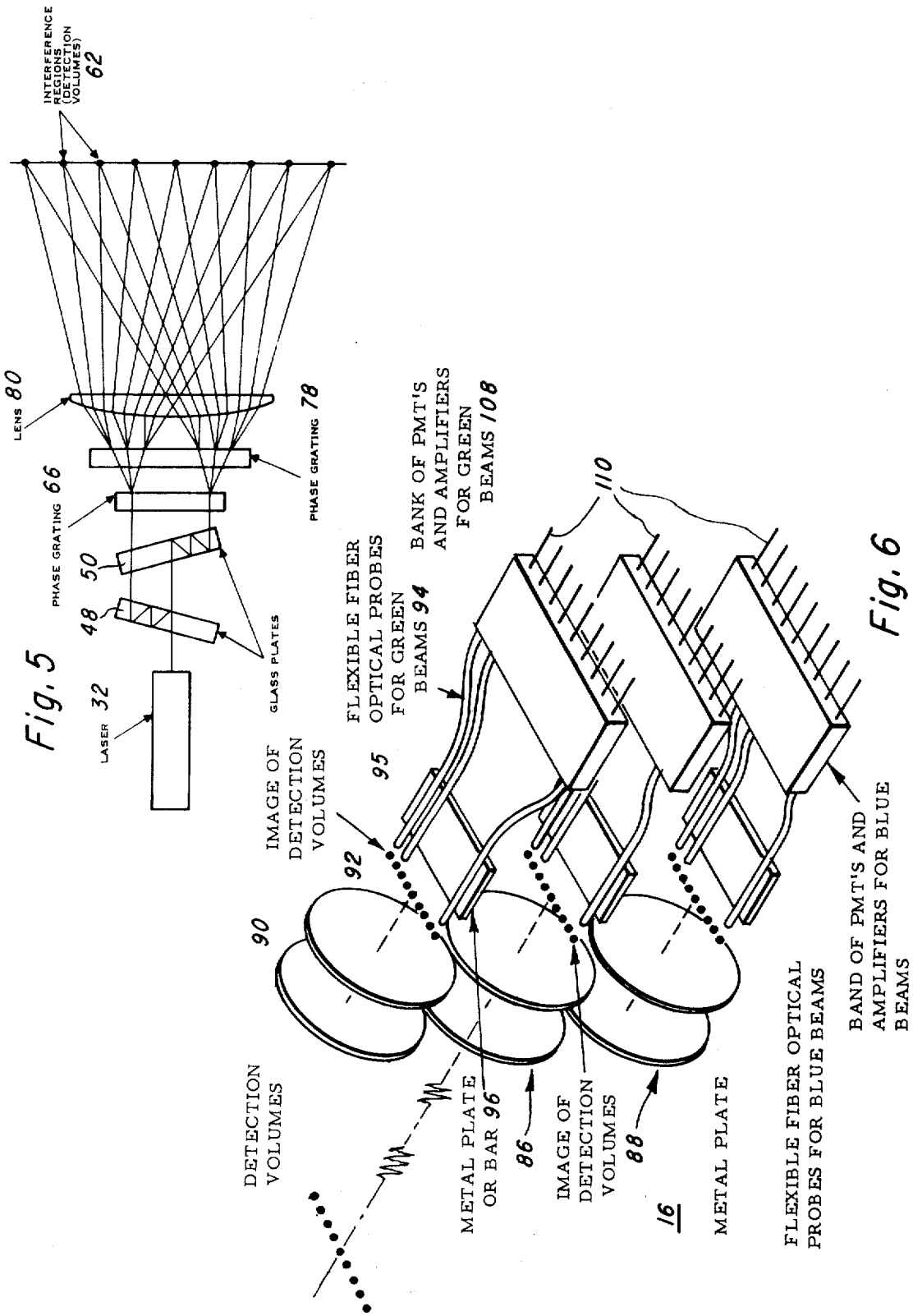

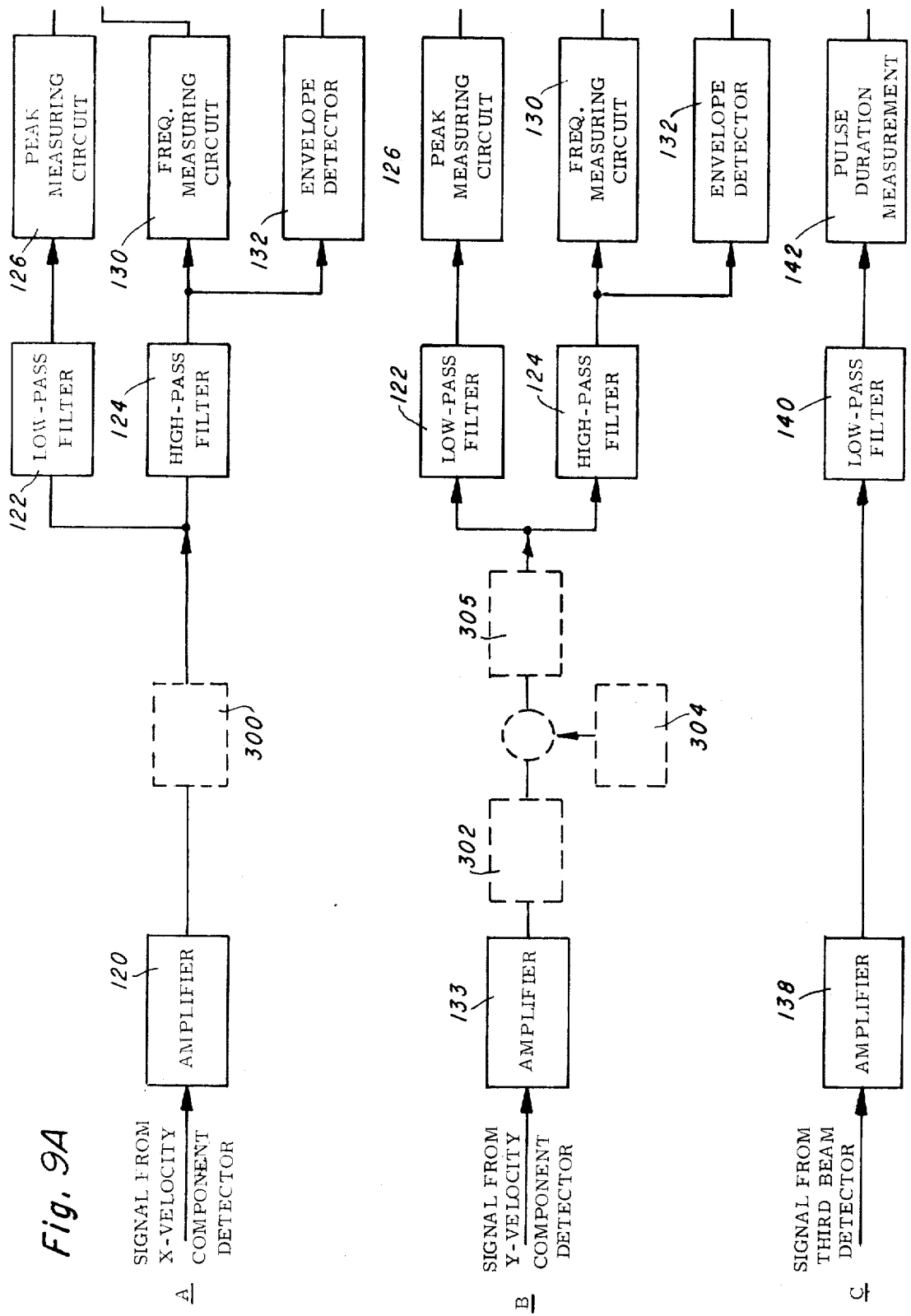

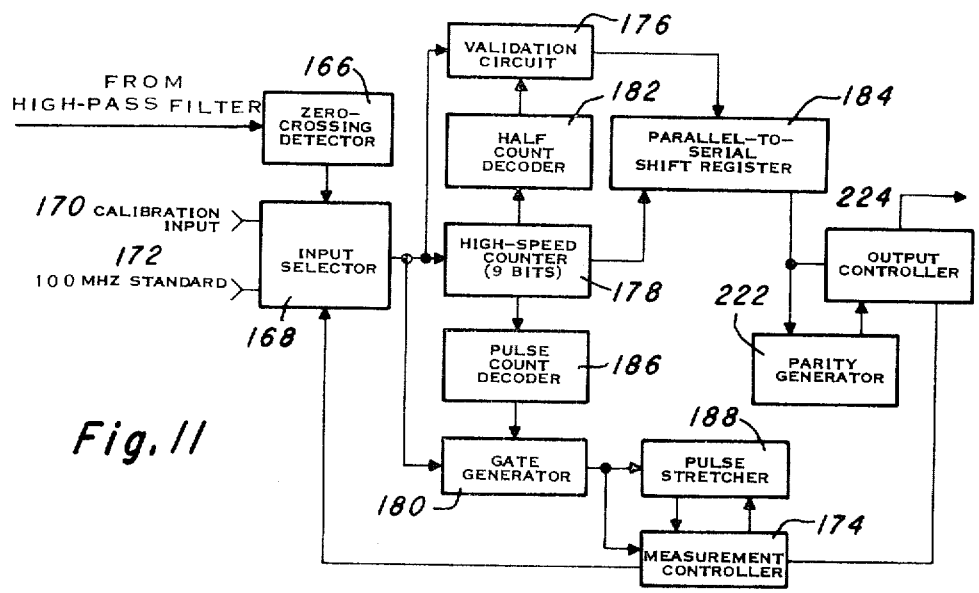
Fig. 11
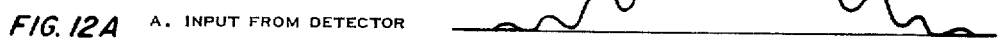
FIG. 12A    A. INPUT FROM DETECTOR
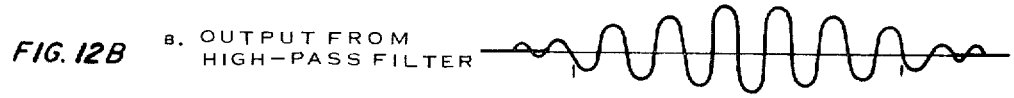
FIG. 12B    B. OUTPUT FROM HIGH-PASS FILTER
FIG. 12C    C. OUTPUT FROM ZERO-CROSSING DETECTOR
FIG. 12D    D. FULL COUNT RATE
FIG. 12E    E. CHARGE ON STORAGE CAPACITOR
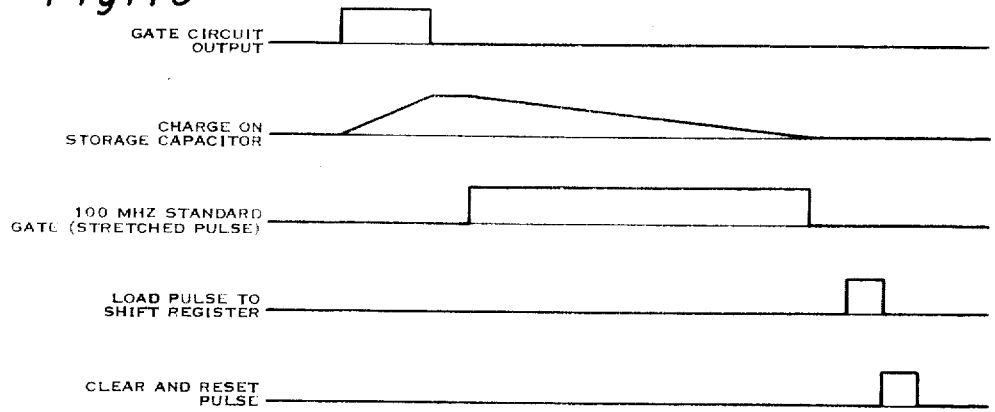
Fig. 13

MULTIPLE DETECTION VOLUME LASER DOPPLER VELOCIMETER

This invention relates to measurement instruments and more particularly to an opto-electronics device for measuring the velocity, size, and number density of particulate matter in a plurality of positions within a flow of fluid.

In the past, holography has been used in several ways to measure the size and number distribution of small particles in an aerosol. Holography is an interferometric technique by which three-dimensional information can be recorded on a two-dimensional photograph; this is a step process consisting of first photographing the interference pattern that exists when a diffracted or object field (Fresnel or Fraunhofer diffraction pattern of the object) is allowed to interfere with a reference field or background wave. Holography has been used in several ways to measure small particles—first as a photography of individual particles by holography for subsequent viewing for size distribution or shape analysis; second as a photography of clouds of particles in three-dimensions with subsequent analysis of the intensity of the reconstructed image to obtain information regarding the particle concentration; and third as a photography of light scattered by the particles, either individually or as a cloud followed by an analysis of the intensity of light scattered by individual particles to obtain size information of particles as small as 5 to 10 microns.

Problems attending the use of holography include: the cost and complexity of the necessary apparatus, the difficulty in making measurements of particle reconstructions from the hologram, and the lack of ability to detect individual submicron particles. Several locations within a holographic reconstruction are necessary to completely classify an aersol. The number of separate locations that must be analyzed across a viewing volume depends on the aerosol type, velocity profile, and concentration profile. To obtain a meaningful statistical analysis of an aerosol, the reconstruction analyzer is usally located on a movable carriage that allows continuously spaced successive planes to be in focus on the analyzer. Another problem with holography is that a continuous measurement of the variation of the entire aerosol as a function of time is not available.

Also in the past, light transmission devices have been used. Such systems include basically a noncoherent light source and a condenser lens for condensing light for passage through a pinhole to a collimating lens. The collimating lens passes collimated light through the aerosol, and through a telescope lens which condenses the light for passage through another pinhole for detection by a photocell. The pinhole apertures are needed in order to prevent scattered light from reaching the photocell. The photocell acts to measure the intensity reduction of the light resulting from scattering and absorption by the particles in the aerosol. Problems with light transmission systems are that the light beam must be projected through windows which must be kept clean to insure reliable operation, and the problem of relating particle size distribution to the reduction in light intensity caused by the particles.

Other systems have been suggested and used and are summarized in Evironmental Pollution Agency Report (EPA Report PB-202 666) entitled "State of the Art: 1971 Instrumentation for Measurement of Particulate Emissions From Combustion Sources," Gilmore J. Sem, et al Thermo-Systems, Incorporated St. Paul, Minn., Apr. 1971. Systems described have one or more of the following disadvantages: A pipe is required to be placed in the flow which disturbs the flow of aerosol; the values of the measurements are not formulated simultaneously with measurement, i.e., the system is not real time; and considerable work by skilled personnel is required to obtain particle size information from the results.

Thus, it is an object of this invention to provide an opto-electronic instrument for measuring fluid velocities, particle size and number density utilizing a simple optical technique.

Another object of the invention is to provide a system capable of simultaneously measuring two orthogonal components of velocity of a particle in an aerosol in a detection volume.

A further object of the invention is to provide a multiple detection volume laser doppler velocimeter.

Still another object of the invention is to provide an instrument to measure the frequency of laser doppler velocimeter signals which can be stored for extensive processing and analysis.

Yet another object of the invention is to provide an instrument which can measure space-time velocity correlations and determine the size of macroscale and microscale eddies in order to develop and substantiate theoretical turbulent flow models by simultaneously making and recording velocity measurements at different points in the fluid flow.

Briefly stated the present invention comprises a multiple detection volume type velocimeter for measurement of space-time correlated velocities, and particulate size and number density in aerosols. The device includes a source of coherent light which produces light beams at selected wavelengths simultaneously. The wavelengths leave the laser concentrically in the same beam, and must be separated for use in two or three distinct systems device. The two system device measures horizontal and vertical velocity components, and particle size up to about 15 microns. The third system when desired is used to measure the size of particles above 15 microns.

In the multiple detection volume velocimeter, an optical system, hereinafter referred to as a multiple beam transmitter, first separates the light into three beams of different wavelengths. Two of the three beams are then divided by the multiple beam transmitter to form two pairs of beams; each pair of beams having substantially the same wavelength, but one beam in each pair is offset in frequency to remove any ambiguity in the sign of the velocity measurement. The resulting two pairs of beams together with the third beam form one set of beams for a detection volume, and the sets of beams are further divided by the multiple beam transmitter for a plurality of sets of beams for a plurality of detection volumes. Finally the multiple beam transmitter causes the beams in the sets of beams to intersect to form a plurality of detection volumes. The two pairs of intersecting beams form horizontal and vertical fringe lines within each detection volume for the two systems measuring respectively the horizontal and vertical velocity components of particles in the moving aerosol. The third beam is for the third system for measuring the time it takes a particle to pass through the detection volume.

If the air flow does not contain enough aerosol to provide adequate velocity measurement, an aerosol source is positioned adjacent to the detection volumes to furnish additional aerosol. The particles passing through the detection volumes scatter the light of the three wavelengths in bursts. The bursts of light representative of the three systems are collected by an electro-optical system, hereinafter referred to as the multiple beam receiver. The multiple beam receiver includes transducers for converting light collected into electrical signals. These electrical signals are processed: (1) to obtain signals for the three systems representative of horizontal and vertical size and velocity components, and time a particle is within a detection volume; and (2) to selectively combine signals to determine the particle size. The data are then digitized and recorded on a suitable recorder and reformated for subsequent data reduction as hereinafter described.

Other objects and features of the invention will become more readily understood from the following detailed description when read in conjunction with the accompanying drawings in which:

FIG. 2 is a schematic diagram of the multiple beam transmitter of the invention;

FIG. 5 is a partial schematic drawing showing two phase gratings used to form nine equal intensity detection volumes;

FIG. 6 is an isometric view of the multiple beam receiver;

Figure 10:
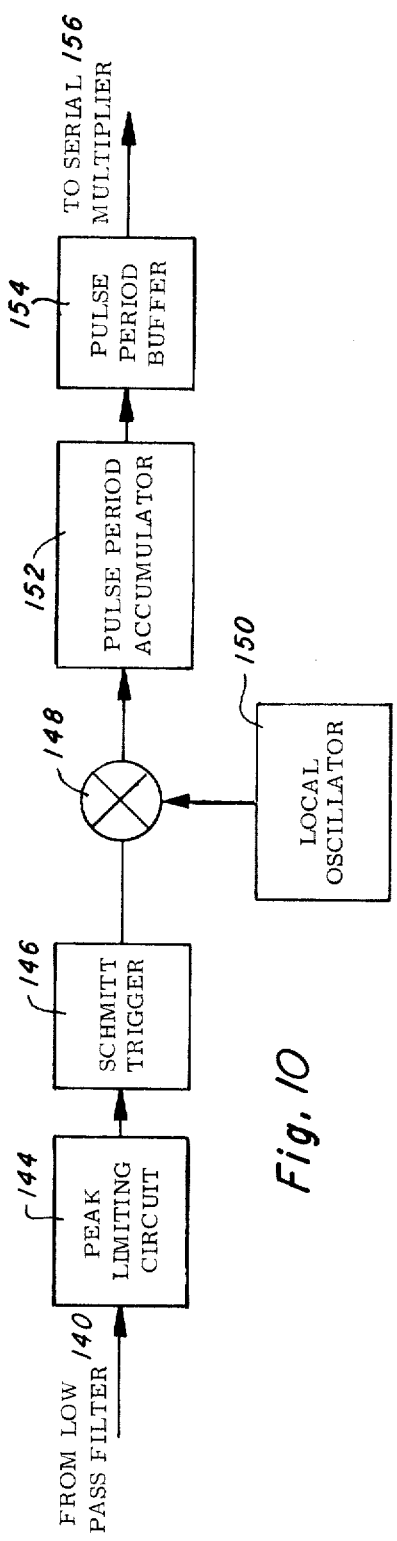
Figure 14:
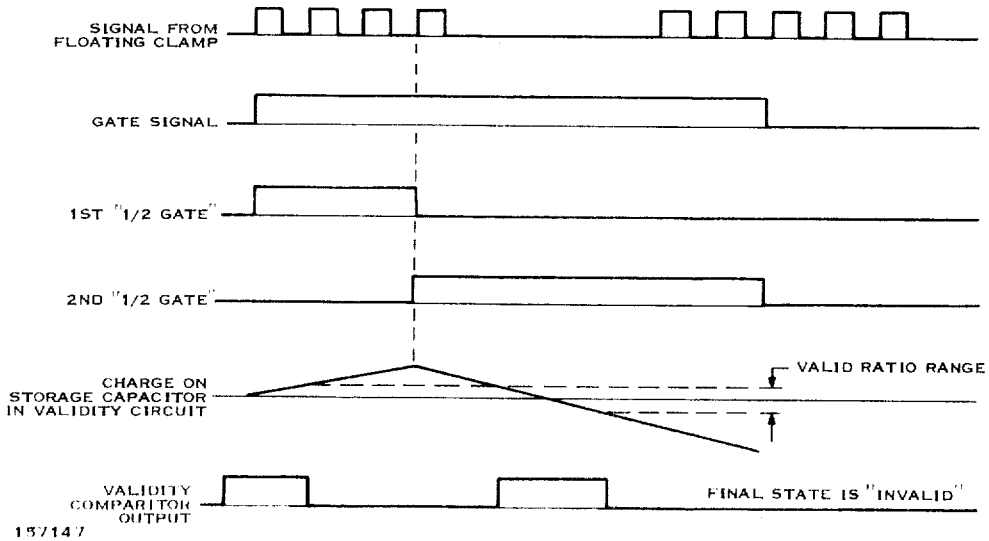
Figure 15:
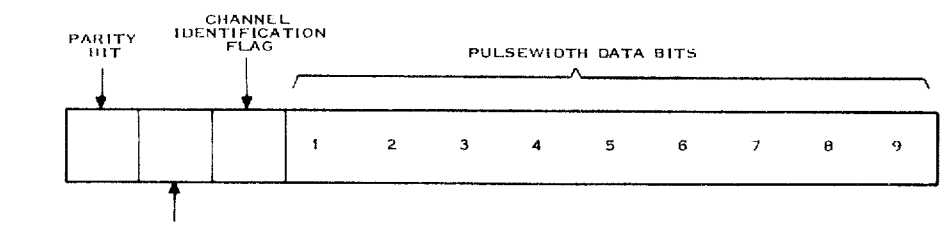

FIGS. 9A and B are block diagrams of the signal processor circuit for each detection volume;

FIG. 10 is a block diagram of the pulse duration measurement circuit for the third beam circuit;

FIG. 11 is a block diagram of frequency measurement circuit;

FIGS. 12 A - E depict the waveforms produced by the frequency measurement circuit;

FIG. 13 depicts the waveforms of the pulse stretcher;

FIG. 14 depicts the waveforms in the validity circuit during detection of an invalid input resulting from a particle grazing the detection volume;

FIG. 15 depicts the frequency measurement circuit output word; and

Figure 16:
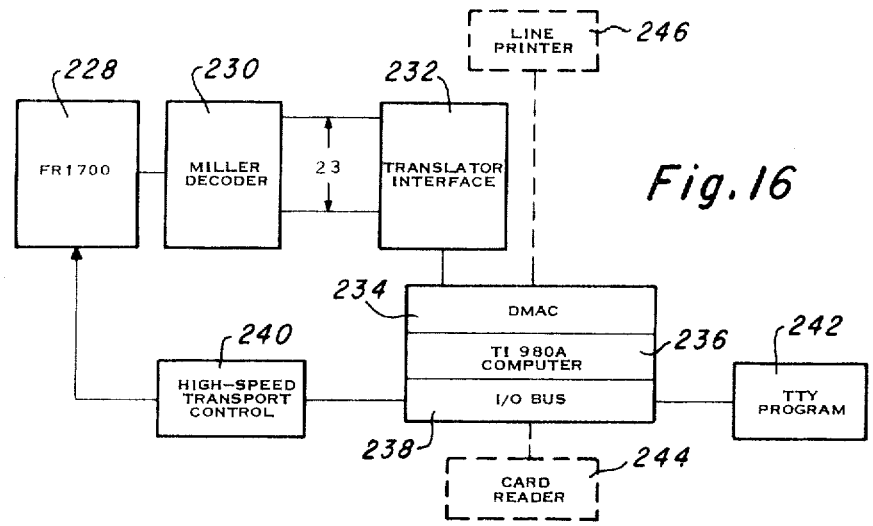

FIG. 16 is a block diagram of the reformating system.

Figure 1:
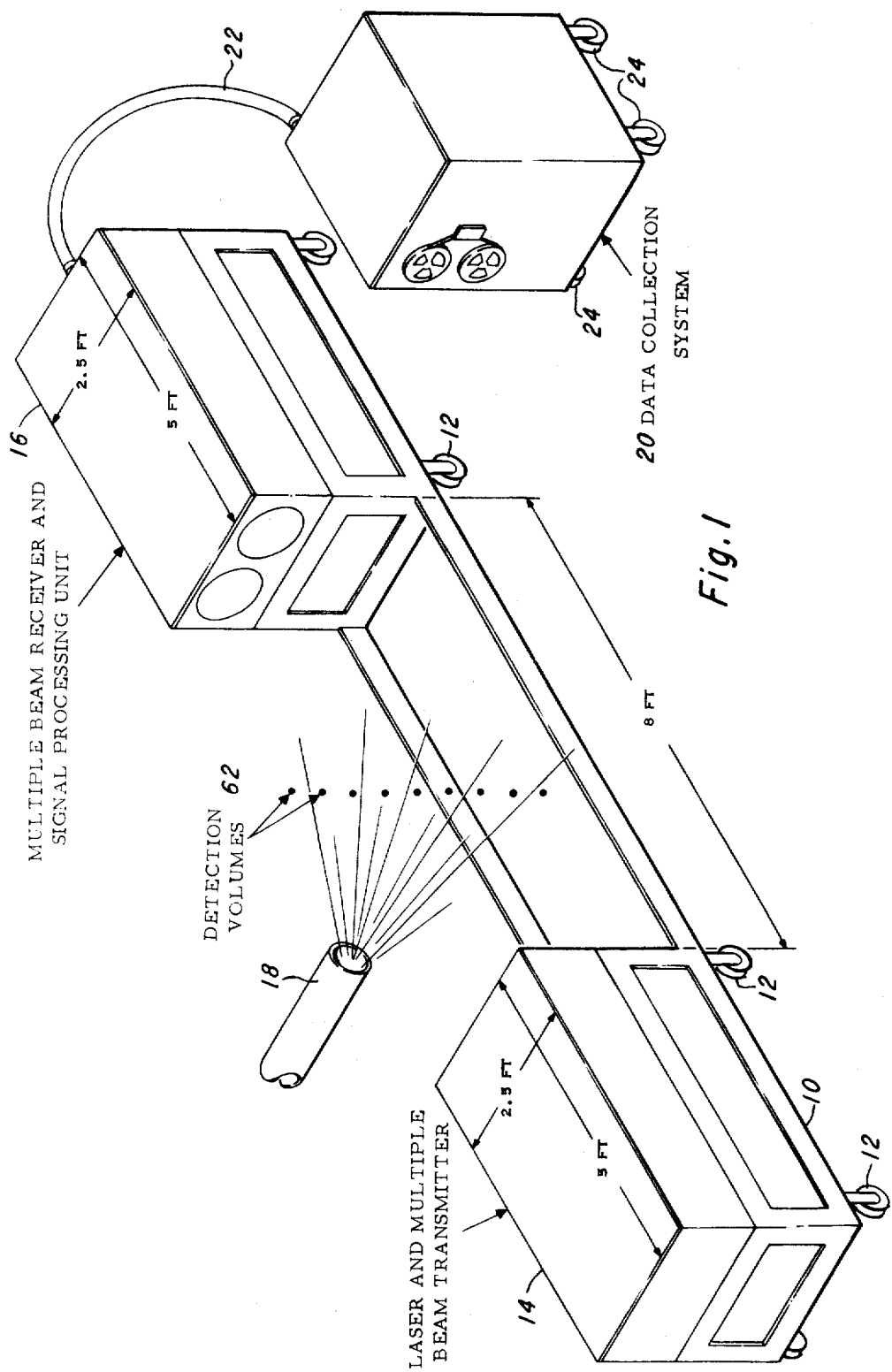
FIG. 1 is a block diagram of the multiple detection volume velocimeter constituting the subject invention.

Referring to the drawings, the velocimeter construction of the present invention (FIG. 1) comprises a frame member 10 mounted upon a plurality of rollers 12. As shown in FIG. 1, frame 10 supports a housing 14 for a source of coherent light and a multiple beam transmitter in spaced relation to a housing 16 for a multiple beam receiver. However, if desired, the multiple beam receiver can be placed anywhere relative to the multiple beam transmitter where the light scattered by the particles can be collected. An aerosol transport member 18 is positioned adjacent the space between the housing 14 and 16 for directing the aerosol sample through a plurality of detection volumes 62, hereinafter described in detail. A data collection system 20 is coupled to the multiple beam receiver housing 16 through bus 22 for storing information generated by the multiple beam receiver. The data collection system 20 is shown mounted upon wheels 24 separate from the frame 10. It will be understood of course that the data collection system 20 could be mounted also upon frame 10.

Referring now to FIG. 2 for a more detailed description, the multiple beam transmitter 14 comprises a source of coherent light 32 which may be, for example, a laser. A suitable laser is CRL (Coherent Radiation Laboratory) Model 53 Argon Laser which produces 2.8 watts of power at 0.5145 $\mu$m wavelengths and 2.5 watts of power at 0.4880 $\mu$m wavelengths. Another suitable laser is Spectra-Physics Incorporated, Model 170–03 which produces 6 and 5 watts of power, respectively, at the above-mentioned micrometer wavelengths. In some applications it will be found that laser produced excess photon fluctuation noise with a center frequency at approximately 100 MHz is undesirable. This noise is eliminated by inserting an etalon in the laser cavity. The etalon restricts the laser to single-frequency operation and completely eliminates the excess photon fluctuation noise. Its disadvantage is that it reaches power output approximately 45 percent. The Spectra-Physics Incorporated laser uses an etalon which allows single mode operation at the 0.4880 $\mu$m and 0.5145 $\mu$m lines simultaneously with the power reduction of approximately 45percent. It is desirable that the laser includes an etalon when studying jet engine noise where frequencies of up to 80 megacycles and higher are encountered. In addition to the two wavelengths, the laser output includes some adjacent wavelengths which are used to form a third beam, hereinafter discussed.

The beam separating stage I splits the beam exiting the laser into five parallel beams 190–198 which fall on lens 56 as shown in FIG. 2. As shown in FIG. 2, beams 190 and 192 can be of wavelength $\lambda_1$ and beams 194 and 196 can be of wavelength $\lambda_2$ and beam 198 of wavelength $\lambda_3$. This approach, called the multiple wavelength approach, is described in detail hereinafter.

In another approach, called the polarization approach and not described in detail, beams 190 and 192 are of wavelength $\lambda_1$ and have a polarization vector at right angles to the polarization vector of beams 194 and 196 also of wavelength $\lambda_1$. The difference in polarizations is carried out by a polarization rotator. Beam 198 has a wavelength $\lambda_2$ and an arbitrary polarization.

In yet another approach not described in detail, called the frequency shifting approach, beams 190 – 196 are all formed from a single wavelength $\lambda_1$ laser beam. Beams 190 and 192 differ in frequency by about 50 MHz and beams 194 and 196 differ in frequency by 100 MHz. The frequency up-shifts can be produced by devices such as Bragg cells. The differences in frequency between all of the beams is so small that they all have very nearly the same wavelength $\lambda_1$. Beam 198 has a wavelength $\lambda_2$.

Returning to the description of the multiple wavelength approach (FIG. 2), the laser wavelengths leave the laser 32 concentrically in the same beam and are reflected by suitable light reflection means such as, for example, two 45° prisms 34 and 36 to the beam separating stage 1. The beam separating stage 1 includes a beam separating prism 40 to separate the coherent light into two diverging beams having wavelengths of 0.5145 $\mu$m and 0.4880 $\mu$m wavelengths, respectively. At these wavelengths the light will appear as green and blue beams, respectively. A second prism 42, which is identical to prism 40 but which is inverted as to the prism 40, is positioned in the paths of the separating beams to make the beams parallel one another as they leave the prism 42. The prisms 40 and 42 are, for example, two dense flint prisms placed in the beam at Brewster's angle. The green beam is received by a pair of horizontally positioned beam splitting glass plates 44 and 46 which split the green beam into two equal intensity and parallel beams 194 and 196 in the horizontal $(x, z)$ plane; while the blue beam is received by two vertically positioned beam splitting glass plates 48 and 50 which divide the blue beam into two equal intensity and parallel beams 190 and 192 lying in the vertical $(x, y)$ plane, Vol. 3, W. T. Mayo, Jr. "Simplified Laser Doppler Velocimeter Optics," Journal of Physics E: Scientific Instruments, Mar. 1970, pp 235–237. The green beams are used to measure the $(x)$ component of velocity and size of the particle in each of the detection volumes 62, hereinafter described, and the blue beams are used to measure the $(y)$ component velocity and size of the particle. The $x$ and $y$ measurements provide acceptable particle size measurements up to about 15 microns. To provide the velocimeter with a large (above 15 $\mu$m) particle size capability, a beam 198 of a third wavelength leaving prism 42, such as the 0.4965 $\mu$ m wavelength of the argon laser, passes to lens 56 and strikes lens 56 in the lens center. Glass plates 44, 46, 48, 50 are either positioned so that the third wavelength beam does not fall on them or are not coated at the point where the third beam passes through them.

Bragg cells 52 and 54 or other frequency upshifting devices are inserted, respectively, into one of the green $(x$ velocity component) beams and into one of the blue($y$ velocity component) beams to upshift the frequency of the beams and cause the interference fringes in the detection volume to move. The moving interference fringes are used to eliminate the ambiguity in the sign of the velocity component measured. The Bragg cells may be, for example, Zenith M40-R Acoustical Optic Light Modulators which upshift the frequencies by 40 MHz. These cells are solid crystal units with an optical efficiency of 86percent. From the Bragg cells 52 and 54, the two green beams and the two blue beams are passed to a lens 56. The two green beams are approximately of equal distance from the center of lens 56 and are on the $x$-axis; the two blue beams are also approximately of equal distance from the center of the lens 56 and are on the $y$-axis. The third beam is centered on the lens 56. The beams pass through lens 56 and are brought to focus in its focal plane. A single pinhole 58 about 10 microns in diameter or larger is placed at the focus of lens 56 to spatially filter all five beams. From the pinhole 58, the pairs of green beams 194 – 196 and blue beams 190 – 192 and the third beam 198 enter the multiple beam splitting stage II.

Figure 3A:
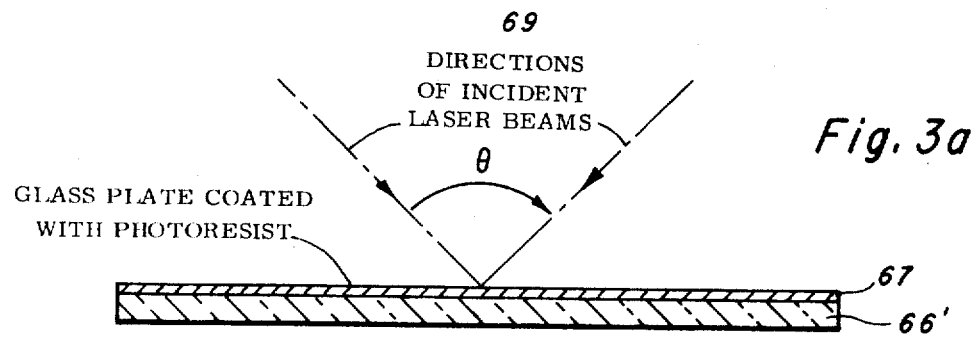
FIG. 3A is a pictorial view demonstrating the method of forming the phase gratings using the laser beam technique.
Figure 3:
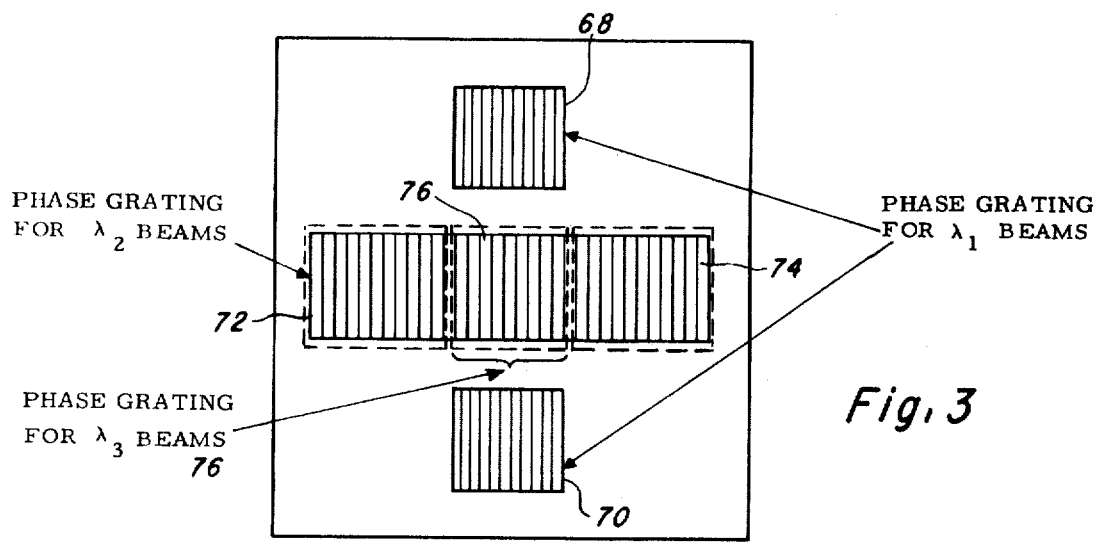
FIG. 3 is a plan view of the phase grating plates of the multiple beam transmitter.

Although each beam may be divided into any number (the number being dependent only upon the power of the laser, the maximum variation in optical path length of the grating, and the use of the velocimeter), stage II, as shown, divides each of the laser beams into nine equal–intensity beams to form nine equal–intensity detection volumes 62. Stage II comprises collimating lens 64 for collimating the diverging beams exiting from the pinhole 58, a pair of gratings 66 and 78 for dividing each beam into a plurality of beams, and lens 80 for converging the beams into detector volumes 62. The collimated beams, which include the two pairs of beams 190–196 and the third beam 198, strike the first grating 66 which splits each beam falling on it into three equal intensity beams, and each of the three beams strike grating 78 which splits each of them into three more beams of equal intensity. Grating 66 is a glass plate with phase gratings on it as shown in FIG. 3. Each grating has the maximum variation in optical path length chosen so that the 0, and the ± 1 orders are of equal intensity, L. P. Boivin, "Multiple Imaging Using Various Types of Simple Phase Gratings," Applied Optics, Aug. 1972, p 1782.

For forming acceptable detection volumes, it is necessary that the beams leave stage II at the same angle. In order to insure that all three beams leave the multiple beam transmitter at the same angle $$(\gamma = \sin^{-1}(\lambda_2 f_2) = \sin^{-1}(\lambda_1 f_1) = \sin^{-1}(\lambda_3 f_3)),$$

It is necessary that $f_1, f_2$ and $f_3$ be chosen such that:

$$\lambda_2 f_2 = \lambda_1 f_1 = \lambda_3 f_3$$

where $f_1$ is the spatial frequency of phase gratings 68 and 70, $f_2$ is the spatial frequency of phase gratings 72 and 74, and $f_3$ is the spatial frequency of phase grating 76.

A novel means of manufacturing the gratings 66 and 78 with the desired phase gratings 68 – 76 thereon is to coat a substrate 66' (FIG. 3A) such as, for example, a transparent glass plate, with a layer of suitable photoresist 67, e.g., a photoresist sold under the trademark "KMER" by Eastman Kodak. A portion of the photoresist is exposed by a first pair of intersecting collimated laser beams 69 coming from a multiple wavelength laser (not shown) tuned to a wavelength $\lambda_1$ to form phase grating 68 of spatial frequency $f_1$ (FIG. 3). A second portion of the photoresist 67 is similarly exposed to form phase grating 70 of the spatial frequency $f_1$ before the laser is tuned to a wavelength $\lambda_2$ and additional portions of the photoresist exposed to produce phase gratings 72 and 74 of spatial frequencies $f_2$ on each side of a fourth portion of the photoresist. The fourth portion of the photoresist is exposed to the laser tuned to a wavelength $\lambda_3$ to form phase grating 76 having a spatial frequency f $_3$. The laser may be an argon laser which is tuned by means of a wavelength selector such as a Littrow prism. It is important that the glass plate and the laser system relationship remain constant so ($\gamma$ the beams $\lambda_1$, $\lambda_2 2_3$ all make the same angle $\theta$ when 1 generate their respective phase gratings.

The tunable laser makes this possible as the relationship ($\lambda_1 f_1 = \lambda_2 f_2 = \lambda_3 f_3$) is automatically satisfied. =photoresist can also 3 printed or projection printed with a Ronchi ruling and developed, but the desired characteristics of maintaining the corresponding beams leaving phase gratings 66 and 78 parallel are difficult to obtain.

Continuing now with the description of the multiple beam transmitter, the blue (y velocity component) beams ($\lambda_1$), which measure the vertical component of velocity, pass through upper and lower phase gratings 68 and 70, respectively, and the green (x velocity component) beams ($\lambda_2$), which measure the horizontal component, pass through the side phase gratings 72 and 74. The center phase grating 76 is provided for the third beam ($\lambda_3$). The second grating 78 is constructed similarly to the first grating 66, but the first phase grating 66 has three times the spatial frequency of the corresponding gratings on the second phase grating 78. The second phase grating 78 splits each beam entering it from the first phase grating 66 into three more equal-intensity beams.

All beams pass through lens 80 which converges pairs of the blue and green beams ($\lambda_1$, $\lambda_2$) with the third beam ($\lambda_3$) to form the detection volumes 62 created in the focal plane of the lens 80.

The spatial frequencies of the gratings can be chosen to vary the distance $\Delta$ between the adjacent detection volumes in accordance with the formula $$\Delta = \lambda_1 f_2 F_3 = \lambda_2 f_2 F_3 = \lambda_3 f_3 F_3$$

where $\lambda_1 = 0.488$ $\mu$m; $\lambda_2 = 0.5145$ $\mu$m; and $F_3 = 45$ inches (typical value).

Figure 4:
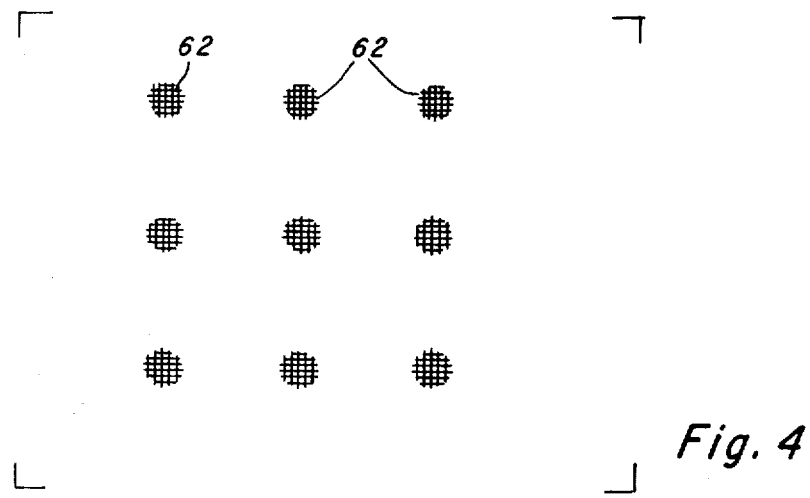
FIG. 4 is a view of the multiple detection volumes, including the fringe lines thereof, formed by the multiple beam transmitter.

For example, when the system is set up so that the frequencies of grating 66 are three times that of grating 78, grating 66 can have a spatial frequency of about 150 cycles per millimeter. Hence, the spatial frequency of phase grating 78 will be about 50 cycles per millimeter and the maximum beam separation is nearly 1 inch. Assuming grating 66 has a spatial frequency of 300 cycles per millimeter and grating 78 has a spatial frequency of 100 cycles per millimeter spacing then becomes about 2 inches. Hence, the detection volumes are along a line about 8 inches long in the first example and along a line about 16 inches long in the second example. By rotating gratings 66 and 78, the orientation of the detection volumes can be changed. If gratings 66 and 78 are rotated 90° about the optical axis z, the line of detection volumes is also rotated. With reference to FIG. 1, rotating gratings 66 and 78 by 90° would place the nine detection volumes in a vertical line. If the spatial frequency of grating 66 were made equal to that of grating 78 and grating 66 were rotated 90° with respect to grating 78, the square mesh array of detection volumes shown in FIG. 4 would result. In FIG. 4, the dark vertical and horizontal lines represent the fringe lines thereof. The diameter of the detection volumes are about 0.050 mm, and the power assuming that a CRL Model 53 laser without an etalon is used, is about 81 mw and 90 mw in the blue and green nine detection volume system. In a three volume detection system which is formed by removing grating 78, the power in the blue and green detection volume system is 336 mw and 377 mw, respectively. For simplicity of disclosure of formation of nine equal-instensity detection volumes by two phase gratings, the formation only of the vertical velocity components of the detection volumes is shown schematically in FIG. 5. Unessential elements have been deleted. It will be understood that the formation of the horizontal velocity component of the detection volumes and the nine third beams will be formed similarly. The three systems do not interfere one with another because of their different frequencies or wavelengths or polarizations.

An aerosol air flow passes through the detection volumes 62 from a source 18 thereof (FIG. 1) and any particles contained therein scatters the light forming the detection volumes. Thus, a particle passing through a detection volume produces a light burst proportional to its size and velocity. A multiple beam receiver 16 (FIG. 6) collects this scattered light and produces output signals indicative of: the x and y velocity components, estimates of x and y dimensions of particle sizes up to 15 microns, and an estimate of particle size for large particles.

The multiple beam receiver 16 (FIG. 6) consists of a section 84 to detect the scattered beam of green light ($\lambda_1$), a section 86 to detect the scattered beam of blue light ($\lambda_2$), and a section 88 to detect light scattered from the third beam ($\lambda_3$). Except for the interference filters used, the physical structures of the sections 84, 86, and 88 are identical. Thus, only one section 84 need be described in detail. The light scattered by the particles enters section 84 of the multiple beam receiver 16 through lenses 90 and 92 (FIG. 6) which image the particles in the detection volume onto a probe 94. A probe 94 is provided for each detection volume of the section to form a bank of probes mounted on a clamp 95 carried by a bar 96. The probe 94 (FIG. 7) comprises a small pipe 100 constructed of any suitable material such as, for example, aluminum, having at one end an aperture 102 slightly larger than the image and at the focus of a small lens 104. The light entering the aperture is collimated by lens 104 and passes through an interference filter 106 to a fiber-optic bundle 108. The filter 106 is centered at the desired wavelength which for system 84 is the $\lambda_2$ wavelength. The fiber-optic bundle 108 is coupled to a photo-multiplier tube (PMT) 110 of a bank of photo-multiplier tubes. Each photo-multiplier tube 110 of the three sections is connected to one of a plurality of signal processor circuits 114 coupled to the data collection system 20 (FIG. 8).

Figure 7:
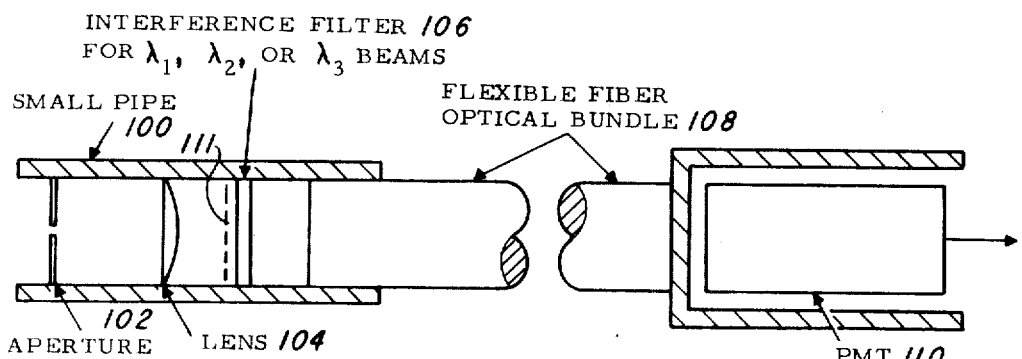
FIG. 7 is a partial sectional view of the photo-optics probe and photo-multiplier tube used in the multiple beam receiver.
Figure 8:
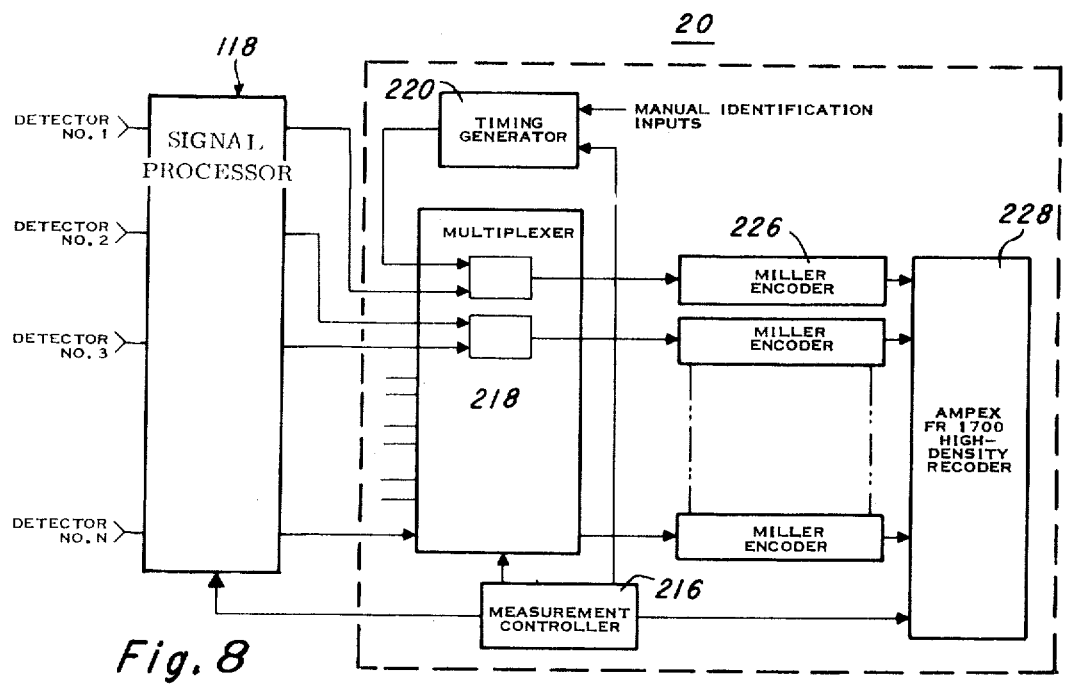
FIG. 8 is a block diagram of the signal processor and data collection system.

If, instead of the multiple wavelength approach, the polarization approach were used in the beam separator stage 1 of FIG. 2, the probe of FIG. 7 will be slightly different. The interference filter will be preceeded by a polarizer 111 shown in dotted lines (FIG. 7). The probes to receive light scattered beams 190 and 192 will have a polarizer oriented to the polarization of these beams and an interference filter for $\lambda_1$. Similarly, the probes to receive light scattered from beams 194 and 196 will have a polarizer oriented to the polarization of these beams and an interference filter for $\lambda_1$. The probe to receive light scattered from beam 198 will contain only an interference filter for $\lambda_2$.

If, instead of the multiple wavelength approach, the frequency shifting approach were used in the beam separator stage 1 of FIG. 2, the probe of FIG. 7 will be slightly different. The probes to detect light scattered from beams 190 – 196 will contain only an interference filter for wavelength $\lambda_1$ and the probes to detect light scattered from beam 198 will contain only a filter for $\lambda_2$.

Figure 9B:
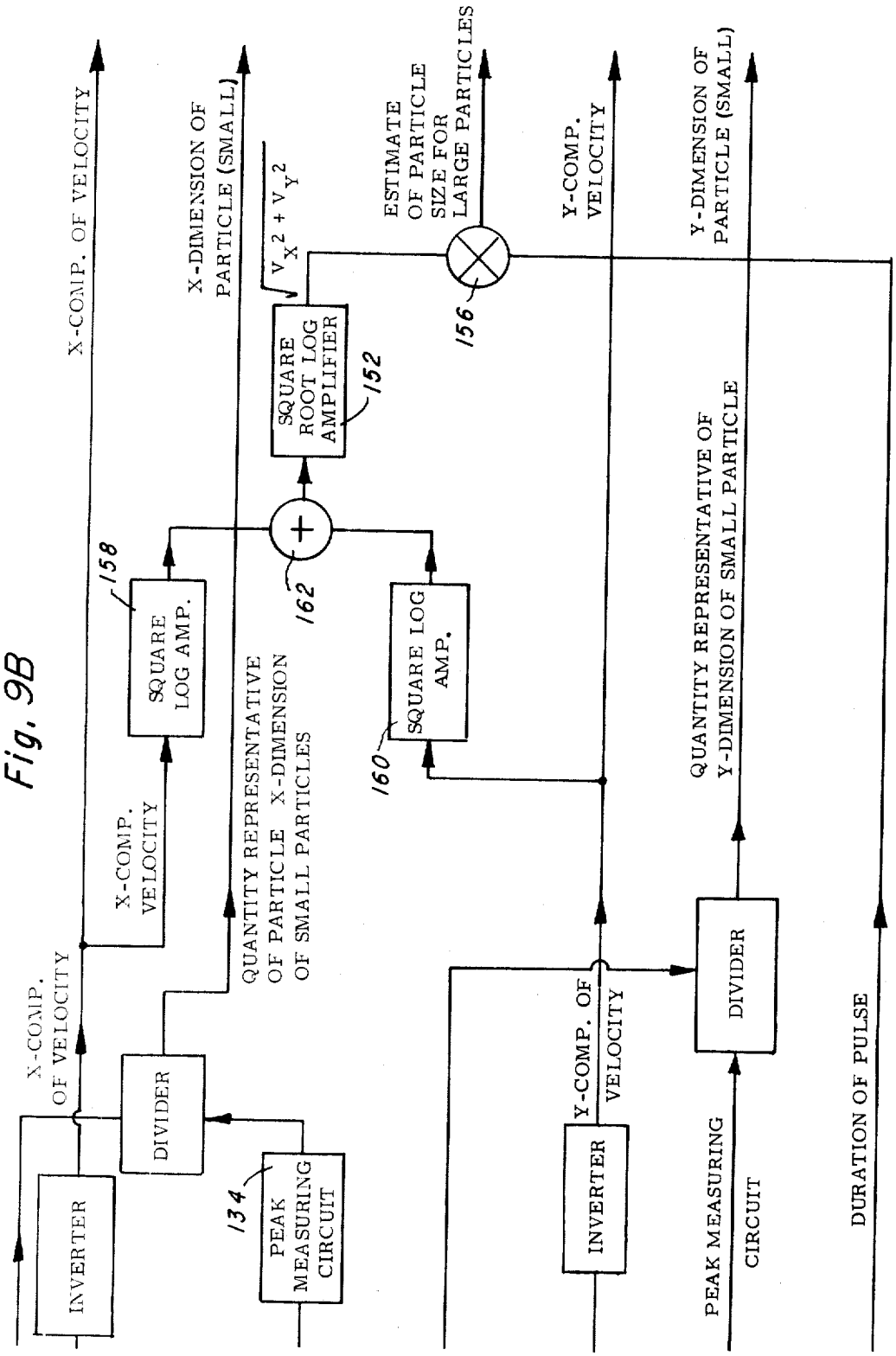

As each signal processor 118 (FIGS. 9A and B) is identical in construction, only one need be described in detail. Each signal processor 118 includes circuits A and B for the x and y particle velocity and dimension component detectors and a circuit C for the third or single beam large particle detector. As circuits A and B are identical, only one (circuit A) need be described. The signal from the *x* velocity component detector or photo-multiplier tube (PMT) 110 is applied to amplifier 120 (FIG. 9A). The amplifier 120 produces an output current proportional in intensity to the light in the particle image. The output of the amplifier 120 (FIG. 9A) is applied to a low pass filter 122 and to a high pass filter 124. The output of the low pass filter 122 is coupled through a peak measuring circuit 126 to one input of a divider 128 (FIG. 9B); the output of the high pass filter 124 (FIG. 9A) is applied to a frequency measuring circuit 130 to provide a signal indicative of the *x*-component velocity, and to an envelope detector 132 whose output is applied through a peak measuring circuit 134 to a second input of divider 128.

If the frequency shifting approach is used, a high-pass filter 300, shown in dotted lines, follows amplifier 120. The high-pass filter 300 for circuit A passes frequencies from about 0 to 75 MHz and the high-pass filter 302 for circuit B passes frequencies from 75 Mhz to about 125 MHz. The output of filter 302 is heterodyned with a 50 MHz oscillator 304 followed by a high-pass filter 305 from d.c. to 75 MHz. These frequency values are typical of those that might be used in jet noise studies.

When the multiple wavelength approach is used, the following description applies. The divider 128 (FIG. 9B) provides an output signal which is representative of the *x* dimension of small particles. Circuit B provides an output signal which is representative of the *y* dimension of small particles. Circuit C, which is used to estimate the size of large particles, includes an amplifier 138 (FIG. 9A) coupled to a detector of photomultiplier tube 110 whose output is an amplified signal proportional to the light intensity of the single beam detector. The output of amplifier 138 is passed through a low-pass filter 140 to a pulse duration measurement circuit 142 which provides a signal indicative of the duration of pulses passing the low pass filter.

The pulse duration measurement circuit 142 is shown in FIG. 10 and comprises a peak limiting circuit 144 coupled to the output of the low pass filter 140. The peak limiting circuit amplifies and clips the incoming signal. A Schmitt trigger circuit 146 receives the clipped signal and produces a square pulse, the duration of which is the same as the incoming pulse. The square wave pulse is clocked to determine its duration by a digital processor which includes a multiplier 148 receiving at one input the square wave pulses and at another input the reference frequency of a local oscillator 150 to produce a signal for a pulse period accumulator 152. The output of the pulse period accumulator 152 is a signal indicative of the duration time of the light burst. This signal is stored in a pulse period buffer 154 and applied as one input to a multiplier 156 (FIG. 9A). The other input of the multiplier 156 (FIG. 9B) is coupled to a signal indicative of the velocity of the particle whose size is being measured. The velocity signal is produced by obtaining electronically from circuits A and B the resultant of the *x* and *y* velocity components as follows. The *x* and *y* components of particle velocities of circuits A and B are coupled, respectively, through square log amplifiers 158 and 160 (FIG. 9B) to a summer 162. The output of summer 162 is passed through a square root log amplifier 164 to the multiplier 156. The multiplier 156 electrically multiplies the velocity of the particle by the time of duration of the particle generated pulse to produce a signal indicative of the particle size.

Although the signal processor is constructed of elements known to those skilled in the art, a more detailed description of the frequency measuring circuit 130 (FIG. 9A) is provided.

The frequency measuring circuit 130 is shown in block diagram in FIG. 11 and includes a zero crossing detector 166 coupled to the output of high pass filter 124. The waveforms of the input and output signals of high pass filter 124 are shown in FIGS. 12A and 12B, respectively. The output of the zero crossing detector 166 whose waveform is shown in FIG. 12C is applied to one input of an input selector 168 to provide a logic level pulse output for each cycle of the envelope. Other inputs to the input selector 168 are a calibration pulse 170 and a standard frequency signal 172. One (or none) of the three signals is selected by a control logic or measurement controller 174, which is coupled to the input selector, and fed to the remainder of the measurement circuitry at the appropriate time. The selected output of the input selector is selectively fed to a validation circuit 176, high speed counter 178, and gate generator 180.

At the start of a 10 μs measurement interval, the high speed counter 178 is cleared and the detected zero crossing pulses are fed from the zero crossing detector 166 to the counter 178. The first pulse admitted to the counter 178 also switches the gate generator circuit 180 into the "on" condition. The high speed counter output is coupled to a half count decoder 182, a parallel-to-serial shift register 184, and to a pulse count decoder 186. Additional input pulses from the input selector 168 cause the high-speed counter 178 to accumulate counts until a preset count of six is detected by the pulse count decoder 186. The pulse count decoder 186 is coupled to the gate generator 180 and the presence of a true signal at the output of the pulse count decoder 186 causes the next arriving pulse to switch the gate generator circuit 180 into the "off" condition while stepping the measurement controller 174 into the next state. The measurement controller 174 is interconnected to a pulse stretcher such as, for example, a monostable multivibrator 188; the next state of the measurement controller 174 clears the high speed counter 178 and activates the pulse stretching circuit 188.

The relationship of the gate pulse to a predetermined number of cycles of the input is shown in FIG. 12D. During the time the gate circuit is in the "on" condition, the pulse stretcher 188 is gating the output of a constant current generator onto the storage capacitor of the monostable multivibrator (not shown). When the gate ends, the voltage across the capacitor has risen to a value proportional to the width of gate pulse and hence, to the period of a fixed number of cycles of the input data (FIG. 12E).

When the gate generator 180 (FIG. 11) and the high speed counter 178 are cleared to zero, the measurement controller 174 causes a constant current sink 210 to be placed in parallel with the capacitor of the monostable multivibrator and the standard reference frequency 172 (FIG. 11) to be selected as the input to the counter 178. The constant current sink causes the voltage across the capacitor to decrease in a linear ramp. A comparator (not shown) or zero crossing detector detects the instant that all stored charge has been removed from the capacitor and causes the controller 174 (FIG. 11) to remove the standard frequency 172 from the input to the counter 178. Since the capacitor is discharged at a linear rate the time required for it to reach ground state will be proportional to the initial voltage and discharge rate. As the discharge rate will be a constant value lower than the charge rate, the time required will be a fixed multiple of the duration of the input gate, and the count accumulated in the counter will be an accurate measure of the period of the chosen number of input pulses. The waveforms are shown in FIG. 13. To cover the entire range of 120 MHz to 1.2 MHz, a plurality of pulse stretching ranges are required.

It will be recognized that it is possible for a particle to graze the edge of a detection volume and activate the measuring circuit without providing a sufficient number of cycles to cause the pulse-count decoder 186 to terminate the initial counting period. Then should another particle enter the detection volume during the sampling period, the first pulse of its burst would cause the decoder to terminate the gate period giving an erroneously long value for the measured period. This situation is shown in FIG. 14. To detect this condition, the validity circuit 176 is used (FIG. 11). The validation circuit 176 is identical in construction to the pulse stretching circuit 188 with the exception that the constant current charge and the discharge circuits have the same values. The validation circuit is controlled by the half count decoder 182 (FIG. 11) coupled between the validation circuit 176 and the high speed counter 178. The half count decoder 182 controls the validation circuit so that its charge circuit will charge during the first half of the initial counting period and discharge during the second half of the counting period. If the first half period is equal to the last half period, the resulting charge on the storage capacitor will be zero. Any large charge, positive or negative, remaining on the capacitor indicates an anomalous situation. This is detected by one of two comparators (not shown) and flag an invalid condition.

Termination of the stretched pulse counting period will cause the contents of the counter 178 (FIG. 11) to be shifted into the parallel-to-load, serial out shift register 184.

At the same time that the output of the high speed counter 178 (FIG. 11) is loaded into the shift register 184, two additional bits are loaded. One is a channel identification flag which is zero for all even numbered channels. This bit identifies the odd and even channels which will be multiplexed onto one tape channel. The second bit is the validation bit for the validation circuit 176 (FIG. 11). At the end of the pulse stretching cycle, the contents of the high speed counter, flag bit, and the validity but are strobed into the shift register 184 leaving the control circuit free to clear the remainder of the measurement circuit in preparation for the next cycle.

The data collection system 20 (FIG. 8) is used to collect and record the velocity and particle size information from the signal processors. It includes a measurement controller 216 for controlling a multiplexer 218 and a timing generator coupled to the multiplexer. The multiplexer samples the $x$ and $y$ velocity component signals, the $x$ and $y$ dimension signals of the particles, and the large particle size signals of the signal processor. When the control circuit 216 switches the multiplexer 218 to the individual measurement circuits, the shift register 184 (FIG. 11) shifts the 11 bits it contains out at a 2.4 megabit per second rate. As the data is shifted the parity generator 222 toggles for each true bit shifted out through an output controller 224. Thus, the parity bit is true if an odd number of trues are contained in the output data, and is false for an even number. The value of the parity circuit is supplied to the multiplexer 218 as the 12$th$ bit output and thereafter serves to flag errors occurring in data transfer. The format of the output word is shown in FIG. 15.

The timing generator 220 (FIG. 8) supplies a pseudomeasurement input to the number one active input of the multiplexer 218. The actual bit configuration will contain synchronizing sequences which allow the output circuitry to "lock on" to the output data stream in the right phase. In addition, the timing generator 220 through the manual identification input also inserts words for identification, such as words identifying the relative time during a test run, time of day, and test identification numbers as may be required to facilitate later data reduction procedures.

The multiplexer 218 alternately accepts the measurements from two channels and outputs them in a single serial bit to a single Miller encoder circuit 226. At the high operating speed of 100,000 measurements per second, the multiplexer switches 200,000 times per second accepting 12 bits from each channel at a 1.2 megabit per second rate. For a nine volume detector system producing five signals each, 23 Miller encoders are required. The output of the Miller encoders 226 are to a high speed tape transport 228. A suitable high speed transport is Ampex FR1700 high density recorder.

Before the data recorded during the test run is reduced, it is reformatted into a form acceptable to a computer. For practical purposes this means standard format digital magnetic tape. A suitable system is shown in FIG. 16. The tape of the high speed recorder 228 which records at a speed of 120 inches per second, is played back at a speed of 7 ½ inches per second, affecting a speed reduction of 16. A Miller decoder circuit 230 regenerates the data and clock for input to the translator interface circuit 232. The translator interface circuit 232 uses the synchronizing words recorded by the timing generator 220 to lock on to the data outputs. The translator interface circuit 232 separates the words according to channel and feeds them through a direct memory access channel 234 into a memory of computer 236. The direct memory access channel 234 is a cycle stealing input/output port to the computer 236, i.e., it temporarily halts the normal computer program and allows data to be stored or extracted directly into or out of the computer memory without requiring attention from the computer program. The data loaded would include the timing code and identification words from the timing generator 220. The computer program examines these words and, using its I/O bus 238 to couple the computer output to a transport controller 240, causes the tape to go forward or backward at a high speed to locate tests or portions of tests that are of interest. A suitable computer is Texas Instruments 980A computer.

The minicomputer 236 will use two sections of its memory as buffers. While one buffer is being loaded from the high speed transport, the other buffer will be dumped on the digital magnetic tape over the DMAC 234 channel. Buffer size is large enough and the output is fast enough to allow insertion of required interrecord gaps in the output digital tape.

A teletypewriter 242 is used to input programs to the computer 236 by way of punched paper tape and is used as the man/machine communications link for error message output. It will be appreciated of cource that the teletypewriter will suffice in this role only as long as a few basic programs are used. If the work load expands, it will be necessary to use a card reader 244, shown in dotted lines in FIG. 16, for program input. A high speed line printer 246, also shown in dotted lines, is added to the system to permit a quick look into the data reduction process to verify that the data obtained was in fact worthy of the time, effort, and expense of full-scale reduction.

Although only a single embodiment of this invention has been described herein, it will be apparent to a person skilled in the art that various modifications to the details of construction shown and described may be made without departing from the scope of this invention.

What is claimed is:

1. A multiple detection volume velocimeter comprising:
   a. a source of coherent light;
   b. a multiple beam transmitting means including an optical grating means for forming the light from the light source into a plurality of detection volumes;
   c. a transducer means operatively responsive to light scattered by particles passing through the individual detection volumes to produce electrical signals representative of the light intensity; and
   d. a signal processor means for processing the electrical signals of the transducer means into particle information signals.

2. A multiple detection volume velocimeter according to claim 1, wherein said source of coherent light is a laser producing coherent light at selected wavelengths.

3. A multiple detection volume velocimeter according to claim 2, wherein said multiple beam transmitter comprises:
   a. a beam separator for separating the combined laser beam into a plurality of beams at selected wavelengths;
   b. a beam splitter for splitting each beam of selected wavelengths into a pair of beams; and
   c. an optical grating means operatively responsive to the split beams to form a plurality of detection volumes of said beams.

4. A multiple detection volume velocimeter according to claim 1, wherein said transducer means for producing electrical signals representative of the light scattered from the detection volumes is a plurality of photo-multiplier tubes.

5. A multiple detection volume velocimeter according to claim 1, wherein said transducer means for producing electrical signals representative of the light scattered from the detection volumes is a solid state light sensor.

6. A multiple detection volume velocimeter according to claim 1, wherein the signal processor means for processing the electrical signals of the transducer means into particle information signals produces signals indicative of particle velocity components.

7. A multiple detection volume velocimeter according to claim 1, wherein the signal processor means for processing the electrical signals of the transducer means into particle information signals produces signals indicative of particle size components.

8. A multiple detection volume velocimeter according to claim 1, wherein the signal processor means for processing the electrical signals of the transducer means into particle information signals produces signals indicative of particle size.

9. A multiple detection volume velocimeter according to claim 1, wherein the signal processor means for processing the electrical signals of the transducer means into particle information signals produces signals indicative of particle velocity components, particle size components up to about 15 microns, and particle size above about 15 microns.

10. A multiple detection volume velocimeter according to claim 3, wherein said beam separator comprises a pair of dense flint prisms placed in the path for the laser beam at Brewster's angle.

11. A multiple detection volume velocimeter according to claim 3, wherein said optical grating means is a phase grating whose optical path length has a periodic variation across the grating.

12. A multiple detection volume velocimeter according to claim 11, wherein said phase grating has a corrugated surface consisting of the group comprised of rectangularly shaped corrugations.

13. A multiple detection volume velocimeter according to claim 11, wherein said phase grating has a corrugated surface consisting of the group comprised of triangularly shaped corrugations.

14. A multiple detection volume velocimeter according to claim 11, wherein said phase grating has a corrugated surface consisting of the group comprised of sinusoidally shaped corrugations.

15. A multiple detection volume velocimeter according to claim 3, wherein said optical grating means are phase gratings operative to produce detection volumes having a plurality of interference lines.

16. A multiple detection volume velocimeter according to claim 3, wherein a frequency shifting device is positioned in the path of one of said split beams for upshifting the frequency of said beam to cause the interference fringes in the detection volumes to move thereby eliminating ambiguity in the sine of the velocity component measured.

17. A multiple detection volume velocimeter according to claim 3, wherein said beam splitter comprises a combination of coated glass plates positioned in the path of a separated laser beam.

18. A multiple detection volume velocimeter according to claim 3, wherein said beam splitter includes means for splitting a beam into a pair of beams disposed horizontally one to another for measuring the horizontal velocity component of a particle passing through a detection volume, and means for splitting a second beam into a pair of beams disposed vertically one to another for measuring the vertical velocity component of a particle passing through the detection volume.

19. A multiple detection volume velocimeter according to claim 18, wherein said beam separator and beam splitting means which are positioned in the laser path for separating and splitting said beams into horizontally and vertically disposed beams are adapted to pass a portion of the laser beam as a third beam.

20. A multiple detection volume velocimeter according to claim 9, wherein the signal processor means for producing signals indicative of particle velocity components, size components up to about 15 micron, and size above about 15 micron comprises:
   a. amplifiers for amplifying a transducer signal indicative of the horizontal and vertical velocity components, and the duration of a burst of light scattered from a detection volume;
   b. circuitry means coupled to the amplifier responsive to the amplified signal from the $x$ velocity component detector to provide a signal indicative of the ratio of the peaks of low pass filter signals to the peaks of high-pass filter signals whereby a signal indicative of x dimension of particle is produced;
   c. circuitry coupled to the amplifier amplifying the signal from $x$ velocity component detector for producing a signal indicative of the $x$ velocity component of the particle;
   d. circuitry coupled to the amplifier amplifying the signal from the $y$ velocity component detector for producing a ratio of the peaks of low pass filter signals to the peaks of high pass filter signals indicative of the $y$ dimension of the particle;
   e. circuitry coupled to the amplifier amplifying the signal from the $y$ velocity component detector to produce a signal indicative of the y velocity component of the particle;
   f. circuitry coupled to the $x$ and $y$ velocity components signal output terminals for producing a signal indicative of the velocity of the particle;
   g. circuitry coupled to the amplifier amplifying the signal from the third beam detector for producing a signal indicative of the duration of time the particle remains in the detection volume, and
   h. means for multiplying the velocity indicating signal by the duration signal to produce a signal indicative of the particle size for large particles.

21. A multiple detection volume velocimeter comprising:
   a. a source of coherent light;
   b. a beam separator for separating the laser beam into a plurality of beams;
   c. a polarization rotator for rotating the polarization of one of the beams 90°;
   d. a beam splitter for splitting the polarized beams into a plurality of beams; and
   e. an optical grating means operatively responsive to the split beams to form a plurality of detection volumes of said beams.

22. A multiple detection volume velocimeter comprising:
   a. a source of coherent light;
   b. a beam separator for separating the laser beam into a plurality of beams;
   c. a frequency shifting means for shifting the frequency of one of the plurality of beams relative to another of the plurality of beams;
   d. a beam splitter for splitting the frequency shifted beam into a plurality of beams; and
   e. an optical grating means operatively responsive to the split beams to form a plurality of detection volumes of said beams.

* * * * *